J. E. PRÉGARDIEN.
DEVICE FOR UTILIZING THE OFF-GASES FROM BLAST FURNACES FOR PREHEATING THE BLAST.
APPLICATION FILED SEPT. 19, 1912.
1,105,158.
Patented July 28, 1914.
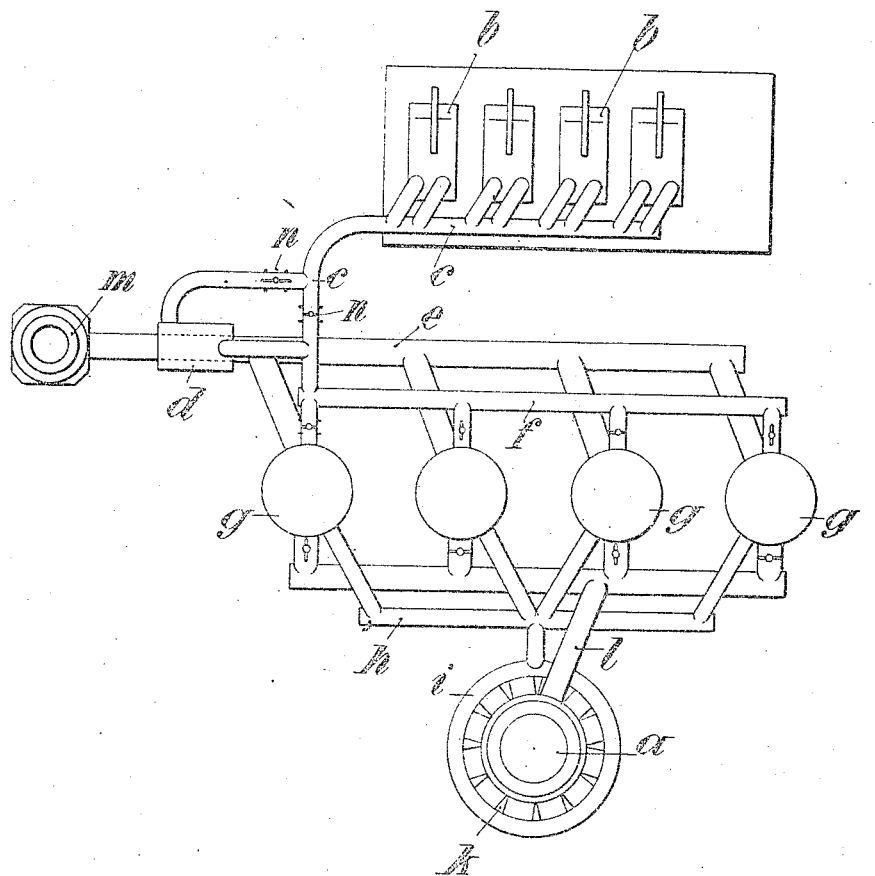

UNITED STATES PATENT OFFICE.

JOSEPH ETIENNE PRÉGARDIEN, OF COLOGNE, GERMANY, ASSIGNOR TO FRITZ NEUMANN, OF AACHEN, GERMANY.

DEVICE FOR UTILIZING THE OFF GASES FROM BLAST-FURNACES FOR PREHEATING THE BLAST.

1,105,158.  Specification of Letters Patent.  Patented July 28, 1914.

Original application filed September 10, 1908, Serial No. 452,511. Divided and this application filed September 19, 1912. Serial No. 721,235.

*To all whom it may concern:*

Be it known that I, JOSEPH ETIENNE PRÉGARDIEN, a subject of the King of Belgium, and residing at Cologne, Germany, have invented a new and useful Device for Utilizing the Off Gases from Blast-Furnaces for Preheating the Blast; and I do hereby declare the following to be a full, clear, and exact description of the same.

This invention relates to a device for preheating the air to be utilized in blast furnaces.

An object of the invention is to provide a device wherein the heat energy of the waste gases from the furnace is utilized for raising the temperature of the incoming air.

Another object of the invention is to provide a device for raising the temperature of the incoming blast prior to the entrance of said blast into other preheating devices.

Another object of the invention is to provide means for utilizing the heat energy of the waste gases after the said gases have served for raising the temperature of the blast prior to the entrance of the blast into the furnace.

Another object of the invention is to provide a device for utilizing the heat energy of the waste gases by means of radiation or direct transmission of the energy to the cold blast without requiring means in which this heat energy remaining in the waste gases is utilized for raising the temperature of any other heat transmitting medium like water or the like.

A method for utilizing the heat energy remaining in the waste gases after the same have been utilized primarily for heating the blast is described in my co-pending application for United States Letters Patent, Serial No. 452511, filed September 10th, 1908, and of which the present application is a divisional.

The invention will be described with reference to the accompanying drawing in the following specification and the novel features of the same will be more clearly pointed out in the appended claim.

The drawing shows a diagrammatic view of the improved device.

The blast to the furnace $a$ is supplied by the blowers or air compressors $b$, the discharge pipes of which are connected to the feeder $c$. This feeder leads from the blowers to a manifold $f$ from which valve controlled branch pipes extend into a plurality of preheating devices preferably in the form of Cowpers or other well known heating devices. The latter may either be built of iron or they may be constructed of masonry in the form of checker work or the like. The air after having been heated to a very high degree in these preheating devices is conveyed into a manifold $h$ which is connected with the circular pipe $i$ surrounding the furnace. The heated wind enters the furnace from this circular pipe through a plurality of nozzles indicated at $k$.

The preheating devices $g$ are heated by the waste gases from the furnace, said waste gases flowing through the conduit $l$ into a manifold which is connected by a plurality of valve controlled branch pipes with the Cowpers or other preheating devices $g$. Experience has shown that the waste gases after having been utilized in these preheating devices for raising the temperature of the incoming blast still possess considerable heat energy. The heat energy of the off-gases from the preheating devices is utilized in the present invention to heat directly the cold air prior to the entrance of the same into the preheating devices.

The preheating devices discharge the waste gases into a manifold indicated at $e$ and in connection with the smoke-stack or chimney $m$. A heat exchange device is built into the manifold $e$ or in the conduit which connects the manifold with the smoke-stack and the cold air from the blowers is conveyed into this heat exchange device so as to pass through said device in a direction opposite to the direction in which the waste gases from the preheating devices flow therethrough.

It may be seen from the drawing that the conduit leading from the feeder $c$ to the heat exchange device $d$ is provided with a valve $n$ and a similar valve $n$ is also interposed in a by-pass which connects the feeder $c$ with the inlet manifold $f$ for the preheating devices. The cold air therefore may either be conveyed through the heat exchange device $d$ when the valves $n$ are in the position shown in the drawing, or the cold air may be conveyed directly into the manifold $f$.

The heat exchange device $d$ preferably is made of iron so as to conduct the heat still remaining in the waste gases from the preheating devices in a very efficient way to the cold air coming from the feeder $c$. As indicated in the drawing this air enters the heat exchange device at one end while the waste gases pass through the same from the other end, so that the air is exposed during a relatively long time to the influence of the heat still remaining in the waste gases.

In the present practice the blast prior to the entrance into the furnace is heated to a temperature of approximately 800 centigrades. The waste gases from the furnace are intermittently conducted to the various preheating devices or in other words during certain periods certain of these preheating devices receive the waste gases and store the same while the cold blast is heated in some of the other devices which have been heated in one of the previous periods. On account of the high temperature required for the blast of the furnace it was necessary to connect each furnace with a plurality of these preheating devices so as to render it possible to heat the same during a relatively long period. Each of the preheating devices therefore was used for heating the blast in relatively long intervals only, while the periods in which the preheating device acted upon the blast were relatively short.

In the subject matter of the present invention the off-gases from the preheating devices act upon the incoming blast directly so that the air enters the preheating devices at a temperature of approximately 200 centigrades and the preheating device therefore must only raise this temperature 600 centigrades. It is obvious that less time is required to store in the preheating device waste gases adapted to cause an increase of 600 centigrades only and it is also obvious that under these conditions a smaller number of preheating devices will be sufficient to perform the same function as a larger number of preheating devices previously used.

I claim:

In combination with a blast furnace blowers for supplying air to the furnace, preheating devices for the air connected with the furnace, a heat exchange apparatus built into the discharge from said preheating devices, a conduit connecting the blowers with said heat exchange apparatus, a by-pass connecting the blowers with the preheating devices directly and valves in said conduit and by-pass.

In testimony whereof I have signed my name to this specification in the presence of two subscribing witnesses.

JOSEPH ETIENNE PRÉGARDIEN.

Witnesses:
  LOUIS VANDORY,
  BESSIE F. DUNLAP.